United States Patent
Tietke et al.

(10) Patent No.: US 8,872,721 B2
(45) Date of Patent: Oct. 28, 2014

(54) RFID READER AND RFID SYSTEM

(75) Inventors: Markus Tietke, Berlin (DE); Frank Fritze, Berlin (DE); Jörg Fischer, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 255 days.

(21) Appl. No.: 13/319,360

(22) PCT Filed: Jun. 8, 2010

(86) PCT No.: PCT/EP2010/057984
§ 371 (c)(1),
(2), (4) Date: Mar. 12, 2012

(87) PCT Pub. No.: WO2010/149490
PCT Pub. Date: Dec. 29, 2010

(65) Prior Publication Data
US 2012/0154246 A1   Jun. 21, 2012

(30) Foreign Application Priority Data

Jun. 23, 2009 (DE) .......................... 10 2009 027 123

(51) Int. Cl.
| | |
|---|---|
| H01Q 21/00 | (2006.01) |
| H01Q 7/00 | (2006.01) |
| G06K 7/10 | (2006.01) |
| G06K 19/077 | (2006.01) |
| G06K 7/00 | (2006.01) |

(52) U.S. Cl.
CPC ...... *G06K 19/07749* (2013.01); *G06K 7/10346* (2013.01); *G06K 7/0008* (2013.01)
USPC .......................................... 343/867; 343/866

(58) Field of Classification Search
CPC .................................. H01Q 1/22; H01Q 7/00
USPC ................... 343/742, 855, 867, 866; 336/180
See application file for complete search history.

(56) References Cited

U.S. PATENT DOCUMENTS

| | | | |
|---|---|---|---|
| 6,027,027 A | | 2/2000 | Smithgall |
| 6,501,364 B1 * | 12/2002 | Hui et al. ....................... 336/200 |
| 7,183,987 B2 * | 2/2007 | Akiho et al. ................... 343/742 |
| 7,333,786 B2 * | 2/2008 | Kikuchi et al. ................ 455/130 |
| 7,417,599 B2 * | 8/2008 | Goff et al. ...................... 343/867 |
| 7,541,930 B2 * | 6/2009 | Saarisalo et al. ........... 340/572.7 |

FOREIGN PATENT DOCUMENTS

| | | |
|---|---|---|
| CN | 1291556 C | 12/2006 |
| DE | 102005055088 | 12/2006 |
| DE | 102006046640 | 4/2008 |
| WO | WO 96/03713 | 2/1996 |
| WO | WO96/03713 A1 | 2/1996 |
| WO | WO2008145505 | 12/2008 |
| WO | WO 2010/149490 | 12/2010 |

OTHER PUBLICATIONS

WIPO, PCT Search Report, PCT/EP2010/057984, Jan. 4, 2012.

* cited by examiner

*Primary Examiner* — Jacob Y Choi
*Assistant Examiner* — Daniel J Munoz

(57) ABSTRACT

The invention relates to an RFID reader having a transmitting antenna (102) and a receiving antenna (104), wherein the transmitting antenna is located a first distance (114) from the receiving antenna, wherein the transmitting antenna has transmitting antenna coils (106) situated in a first plane (108), and wherein the receiving antenna has receiving antenna coils (110) situated in a second plane (112), and having means (130, 132) for positioning an RFID document at a position located a second distance (148) from the transmitting antenna, wherein the transmitting antenna is situated between the receiving antenna and the position.

15 Claims, 3 Drawing Sheets

RFID READER AND RFID SYSTEM

Figure 1:
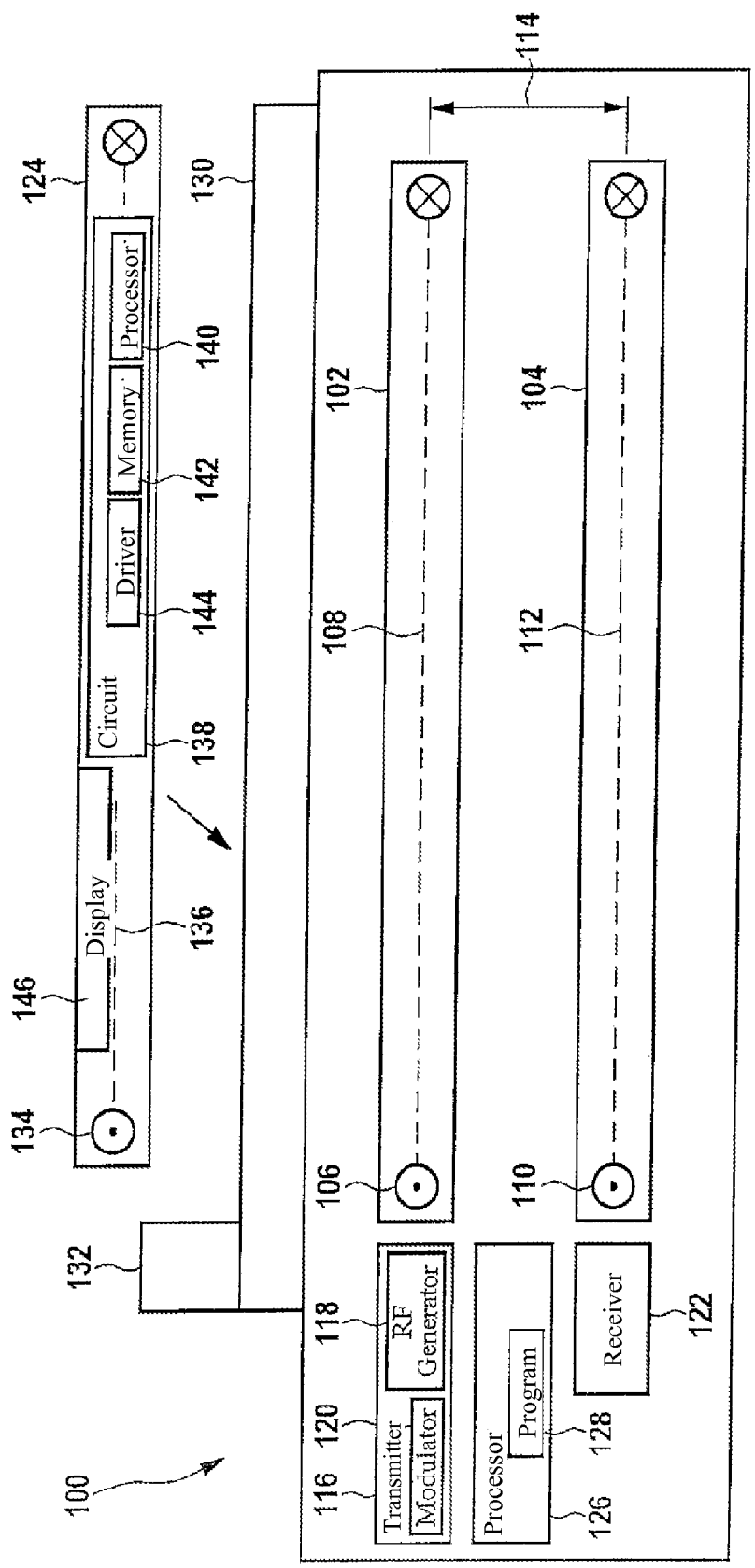

The invention relates to an RFID reader and an RFID system.

RFID systems per se are known from the prior art, in which communication occurs in the radio frequency (RF) range using high-frequency radio signals. Such an RFID system is known from WO 2008/145505 A1, for example.

Accordingly, the object of the present invention is to provide an improved RFID reader and an improved RFID system.

The objects of the invention are achieved in each case by the features of the independent claims. Embodiments of the invention are stated in the dependent claims.

According to embodiments of the invention, an RFID reader having a transmitting antenna and a receiving antenna is provided, wherein the transmitting antenna is located a first distance from the receiving antenna, wherein the transmitting antenna has transmitting antenna coils situated in a first plane, and wherein the receiving antenna has receiving antenna coils situated in a second plane, and having means for positioning an RFID document at a position located a second distance from the transmitting antenna, wherein the transmitting antenna is situated between the receiving antenna and the position.

In the present context, an RFID document is understood to mean any document that contains an RFID circuit, such as a so-called RFID chip, for example. By use of its RFID circuit, the RFID document is able to receive RF signals from the RFID reader and send RF signals to the RFID reader.

For the RF transmission, the RF signals may be modulated on an RF carrier wave, whereby the carrier wave may have a frequency in the megahertz range, for example 13.56 MHz.

An RFID document is understood to mean in particular a value document or security document, for example an identification document, in particular a personal identification card, passport, driver's license, company identification card, or a payment means such as a bank card, credit card, or some other credential such as an admission ticket, or a consignment note, a visa, or the like. The RFID document has a document body which may be paper-based and/or plastic-based. In particular, the document may be a chip card.

In the present context, an RFID reader is understood to mean any device that is able to exchange RF signals with an RFID document, in particular for reading data from an electronic memory of the RFID document.

Embodiments of the invention are particularly advantageous since, due to the positioning of the RFID document with respect to the transmitting antenna, the RFID signals sent from the RFID document to the transmitting antenna are reflected, so that the RFID signals may be received by the receiving antenna with an improved signal-to-noise ratio (SNR).

According to one embodiment of the invention, the second distance is at least 0.7 times the first distance. The second distance is preferably at least 0.8 times the first distance. In particular, the first and second distances may be equal. It is also possible for the second distance to be much larger than the first distance, for example 2 or 3 times the first distance.

According to one embodiment of the invention, the transmitting antenna coils and the receiving antenna coils are situated concentrically with respect to one another. The transmitting antenna coils and/or the receiving antenna coils may be circular or rectangular, for example.

According to one embodiment of the invention, the first and the second planes are parallel to one another. In addition, the means for positioning the RFID document are designed in such a way that a document antenna coil of the RFID document is concentric with the transmitting antenna coils and receiving antenna coils when the RFID document is in the position. In addition, the means for positioning the RFID document may be designed in such a way that a third plane in which the document antenna coils lie is parallel to the first and second planes when the RFID document is in the position.

According to one embodiment of the invention, the RFID reader has an RF transmitter which is connected to the transmitting antenna in order to generate a field, in particular having a field strength which is greater than 7.5 A/m at the position. The RF transmitter thus sends a carrier wave whose field strength at the position is greater than 7.5 A/m.

The RF transmitter is able to modulate an RF signal on this carrier wave in order to send the RF signal to the RFID document when the RFID document is in the position.

The RFID reader also has control means which are designed in such a way that the RF transmitter is controlled in a reception interval for generating the field having the field strength of greater than 7.5 A/m at the position, so that an RF signal which is sent by the RFID document to the RFID reader is superimposed on this field. The RFID reader may thus be designed in such a way that the carrier wave is [transmitted] not only in a transmission interval during which an RF signal is sent from the RFID reader to the RFID document, but also in a reception interval during which an RF signal is sent from the RFID document to the RFID reader. Depending on the embodiment, the carrier wave is not transmitted during the entire transmission interval or reception interval, but, rather, is transmitted with interruptions or a varying field strength, for example in a pulsed manner.

It is particularly advantageous that, despite the high field strength of the carrier wave, reliable reception of the RF signal sent from the RFID document is possible with the aid of the receiving antenna of the RFID reader. This is achieved in that the RF signal sent from the RFID document to the transmitting antenna is reflected, so that the receiving antenna receives the reflected RF signal. Because the distances of the receiving antenna and of the RFID document from the transmitting antenna are approximately the same, the reflected RF signal is particularly strong at the location of the receiving antenna.

Good reception by the receiving antenna of the RF signal sent from the RFID document is still possible even when the second distance, i.e., the distance of the RFID document from the transmitting antenna, is much greater than the first distance, i.e., the distance between the transmitting antenna and the receiving antenna, since in this case as well, the signal-to-noise ratio between the reflected signal received by the receiving antenna and the superimposed carrier wave is relatively high.

According to one embodiment of the invention, the field strength of the carrier wave is greater than 10 A/m, in particular greater than 15 A/m, in particular up to 20 A/m. Due to the high field strength, appropriately high power may be supplied to the RFID document. This is particularly advantageous when the RFID document has no energy store or has a low-capacity energy store, thus requiring the continuous supplying of power in order to operate the RFID document. This is advantageous in particular for RFID documents which have no integrated primary battery. This is very advantageous for identification documents which have no primary battery, and for which the primary battery, which is otherwise necessary for high power consumption by the document, would have to be frequently replaced, or else, the service life of the identification document would be severely limited.

Also very advantageous are embodiments of the invention for RFID documents having an integrated display device, in particular an emissive display device. Namely, for its operation an emissive display device requires relatively high power, which due to the high field strength of the carrier wave generated by the RF transmitter may be supplied to the document with the aid of the document antenna.

According to one embodiment of the invention, the first distance between the transmitting antenna and the receiving antenna is between 5 and 25 mm.

According to one embodiment of the invention, the RFID reader has a support surface for the RFID document which is located at the second distance from the transmitting antenna. The means for positioning the RFID document are thus formed here by the support surface. The support surface may have a guide edge or some other positioning aid in order to position the RFID document relative to the RFID reader within the plane formed by the support surface.

According to one embodiment of the invention, the RFID reader is designed to communicate with the RFID document according to a Near Field Communication (NFC) standard.

In another aspect, the invention relates to an RFID system which contains an embodiment of a reader according to the invention and at least one RFID document. The RFID document has a document antenna having document antenna coils which lie in a third plane. When the RFID document is in the position, the document antenna coils are able to extend concentrically with respect to the transmitting antenna coils and/or the receiving antenna coils. In addition, the RFID document may be designed in such a way that the third plane in which the document antenna coils lie extends parallel to the first and second planes when the RFID document is in the position.

It is particularly advantageous that the most complete symmetry possible of the arrangement comprising the transmitting antenna, receiving antenna, and document antenna causes essentially perfect reflection of an RF signal sent from the RFID document to the transmitter coil, which results in correspondingly good reception of the RF signal by the receiving antenna. In particular, the transmitting antenna, the receiving antenna, and the document antenna may have the same diameter.

The number of coils of the transmitting antenna, receiving antenna, and document antenna depends on the voltage required in each case. For example, the transmitting antenna may have 1 to 8 transmitting antenna coils, in particular two transmitting antenna coils. The receiving antenna may have, for example, 1 to 5 receiving antenna coils, in particular one receiving antenna coil. The document antenna may have, for example, 2 to 6 document antenna coils, in particular 5 or 6 document antenna coils.

Figure 2:
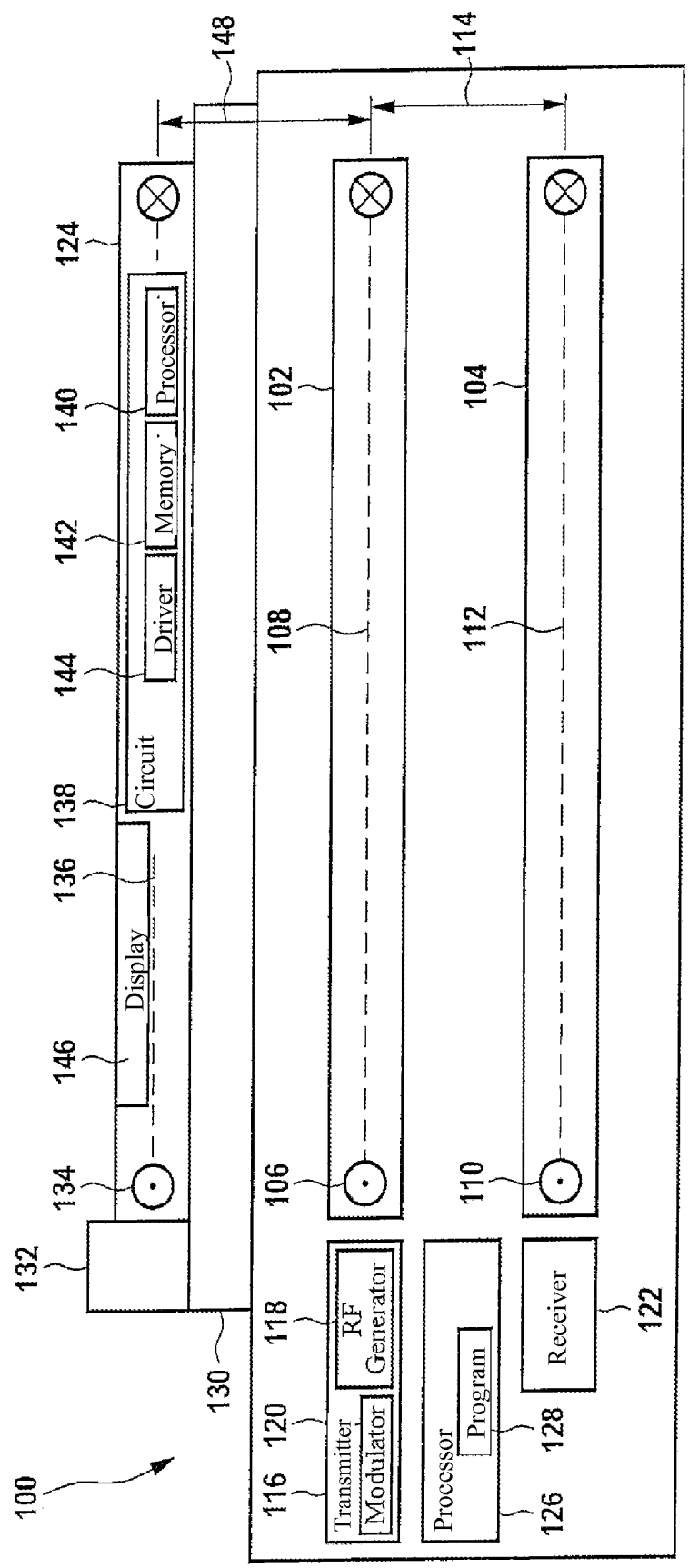
Figure 3:
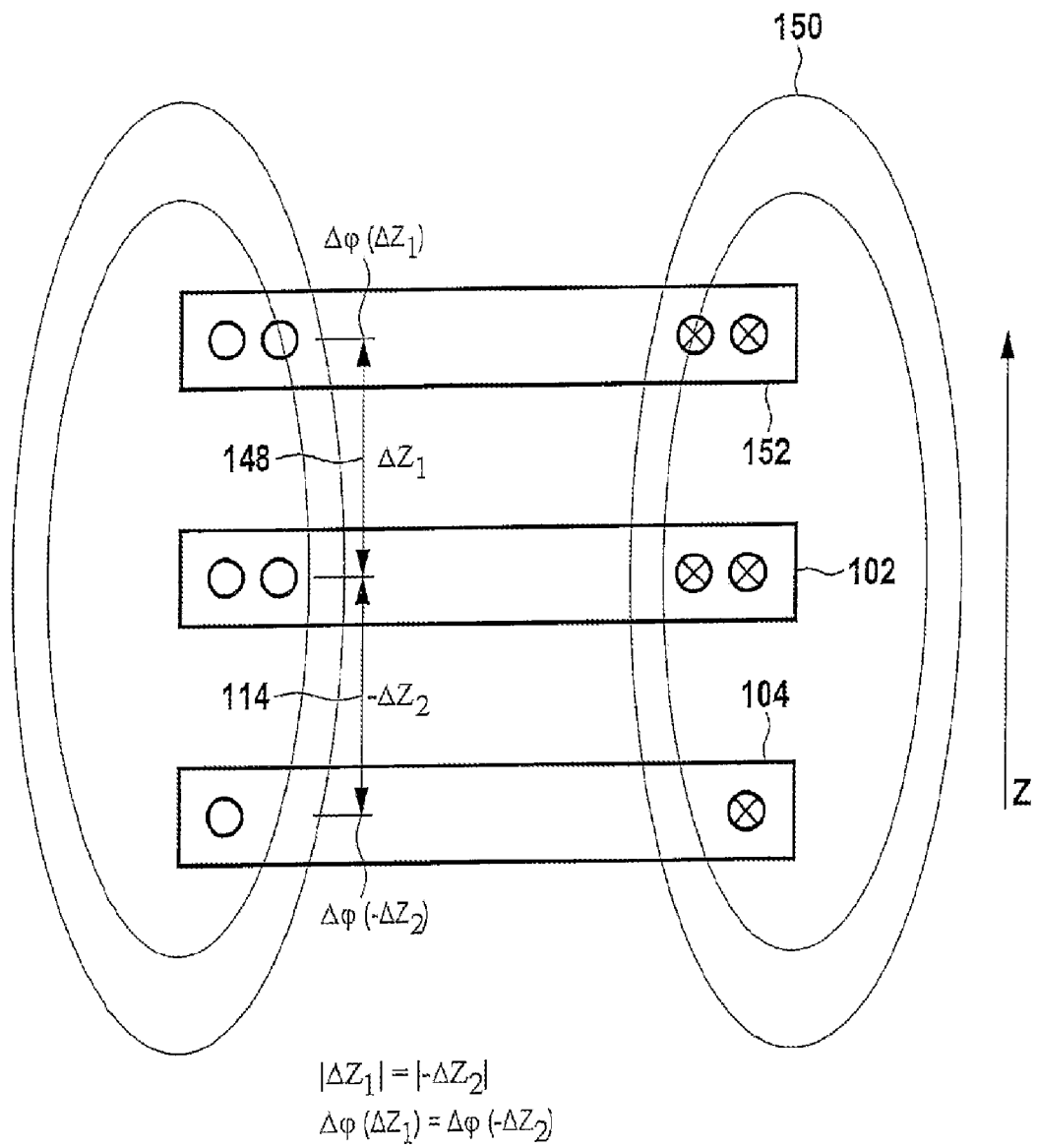

Embodiments of the invention are explained in greater detail below with reference to the figures, which show the following:

FIG. 1 shows a block diagram of one embodiment of an RFID reader according to the invention and an RFID system according to the invention, FIG. 2 shows the embodiment in FIG. 1 after an RFID document has been positioned on the RFID reader, and FIG. 3 shows a schematic illustration of the field, and the reflection of an RF signal sent from the RFID document.

Corresponding elements are denoted by the same reference numerals below.

FIG. 1 shows an RFID reader 100 having a transmitting antenna 102 and a receiving antenna 104.

The transmitting antenna 102 has at least one transmitting antenna coil 106 that extends in a first plane 108. Similarly, the receiving antenna 104 has at least one receiving antenna coil 110 that extends in a second plane 112. The planes 108 and 112 may be parallel to one another. The transmitting antenna 102 and the receiving antenna 104 are located a first distance 114 from one another.

The RFID reader 100 also has an RF transmitter 116, having an RF generator 118 which is designed to generate a carrier wave that is emitted by the transmitting antenna 102. The RF transmitter 116 also has a modulator 120 which is used to modulate an RF signal on the carrier wave.

The RFID reader 100 also has a receiver 122 which is connected to the receiving antenna 104 in order to receive an RF signal that is sent from an RFID document 124.

The RFID reader 100 also has a processor 126 for executing program instructions 128, by means of which the transmitter 116 and/or the receiver 122 is/are controlled.

The RFID reader 100 has means for positioning the RFID document 124 relative to the transmitting antenna 102 and the receiving antenna 104. In the present case, these means for positioning are formed by a support surface 130 situated on the top side of the RFID reader 100. The support surface 130 has a projection 132, protruding in the vertical direction, which forms a guide edge for positioning the RFID document 124 on the support surface 130.

The RFID document 124 has a document antenna having at least one document antenna coil 134 which extends in a third plane 136. The document antenna is used to receive RF signals and to send RF signals, as well as to supply power to the RFID document 124.

The RFID document 124 has a circuit 138, for example a so-called RFID chip, whereby the circuit 138 may be integrated into a document body of the RFID document 124. The circuit 138 has a processor 140 for executing program instructions, as well as an electronic memory 142 and a driver 144 for a display device 146, which likewise may be integrated into the document body.

One or more images may be stored in the electronic memory 142. When power is supplied to the RFID document 124 via the document antenna, the execution of the program instructions by the processor 140 is initiated, so that the memory 142 is accessed in order to control the driver 144 for displaying the images on the display device 146. For example, the RFID document 124 may be designed as an electronic personal identification card, whereby one or more identity photographs are then output on the display device 146. The display device 146 may in particular be designed as an emissive display, in particular as an OLED display.

Further data may be stored in the memory 142, for example information concerning the holder of the RFID document 124, in particular name, address, date of birth, etc., and/or biometric data such as fingerprint or iris scan data. The RFID reader 100 is able to read these data from the memory 142 via RF communication. For this purpose, unilateral or mutual authentication of the RFID reader 100 and of the RFID document 124 may be necessary, in particular according to a Basic Access Control protocol and/or an Extended Access Control protocol.

FIG. 2 shows the RFID reader 100 after the RFID document 124 has been brought into its position in which the exchange of RF signals between the RFID reader 100 and the RFID document 124 is to take place. In this position, the document antenna is located a second distance 148 from the transmitting antenna which is at least 0.7 times the distance 114. For example, distance 148 is approximately equal to distance 114, or distance 148 is greater than distance 114.

In this position, plane 136 is preferably parallel to planes 108 and 112. The transmitting antenna coil 106, the receiving antenna coil 110, and the document antenna coil 134 are preferably situated concentrically with respect to one another; in addition, the transmitting antenna 102, the receiving antenna 104, and the document antenna preferably have the same diameter.

For an RF communication between the RFID reader 100 and the RFID document 124, the transmitter is controlled by the processor 126 by execution of the program instructions 128 in order to emit a carrier wave with the aid of the transmitting antenna 102. By use of the document antenna coil 134, energy from the carrier wave is supplied to the RFID document 124, causing the execution of the program instructions by the processor 140 to be initiated, and the images to be shown on the display 146.

The modulator 120 is controlled by the processor 126 in a transmission interval in order to modulate an RF signal on the carrier wave; the RF signal is emitted with the aid of the transmitting antenna 102, and may be received using the document antenna. The information content of the RF signal is processed by execution of the program instructions by the processor 140, and subsequently a response RF signal is generated by the processor 140. The response RF signal is then sent by the RFID document 124 in a reception interval which follows the transmission interval, so that the response RF signal may be received with the aid of the receiving antenna 104. The response RF signal is demodulated by the receiver 122, and the received data are input into the processor 126 for further processing steps.

The emission of the carrier wave by the RFID reader 100 may also occur during the reception interval, so that the response RF signal is superimposed on the carrier wave. Due to the symmetry of the arrangement, reliable reception of the response RF signal is still possible with the aid of the receiving antenna 104.

FIG. 3 schematically shows the field of the carrier wave 150 which is emitted by the transmitting antenna 102. A field modification of the quantity $\Delta\phi$ which is generated at the second distance 148, i.e., $\Delta z_1$, by the document antenna 152 is reflected by the transmitting antenna coils 106, resulting in a corresponding field change $\Delta\psi$ at distance 114, i.e., $-\Delta z_2$. When the quantities $\Delta z_1$ and $\Delta z_2$ are equal, in the ideal case $\Delta\phi$ is equal to $\Delta\psi$.

Thus, when a field change $\Delta\phi$ is caused by the document antenna 152 as the result of a response RF signal, for a perfectly symmetrical arrangement this results in an equal field change $\Delta\psi$ at the position of the receiving antenna 104, so that the reflected response RF signal may correspondingly be easily received by the receiving antenna 104, even when at the same time the carrier wave 150 is emitted by the transmitting antenna 102 with a relatively high field strength.

LIST OF REFERENCE NUMERALS

100 RFID reader
102 Transmitting antenna
104 Receiving antenna
106 Transmitting antenna coil
108 Plane
110 Receiving antenna coil
112 Plane
114 Distance
116 RF transmitter
118 RF generator
120 Modulator
122 Receiver
124 RFID document
126 Processor
128 Program instructions
130 Support surface
132 Projection
134 Document antenna coil
136 Plane
138 Circuit
140 Processor
142 Electronic memory
144 Driver
146 Display device
148 Distance
150 Carrier wave
152 Document antenna

The invention claimed is:

1. An RFID reader comprising:
a transmitting antenna;
a receiving antenna, wherein the transmitting antenna is located a first distance from the receiving antenna, wherein the transmitting antenna has transmitting antenna coils situated in a first plane, and wherein the receiving antenna has receiving antenna coils situated in a second plane, and
a positioning device comprising a support surface located with respect to the transmitting coil such that an RFID document placed on the surface is located a second distance from the transmitting antenna,
wherein the transmitting antenna is situated between the receiving antenna and the positioning device and wherein the second distance is at least 0.7 times the first distance and less than three times the first distance, such that the RFID document is supported at a known distance from the transmitting and receiving antenna coils.

2. The RFID reader according to claim 1, wherein the first and the second distances are substantially equal.

3. The RFID reader according to claim 1, wherein the transmitting antenna coils and the receiving antenna coils are situated concentrically with respect to one another.

4. The RFID reader according to claim 1 additionally comprising an RF transmitter which is designed for generating a field having a field strength of greater than 7.5 Nm at the position, and an RF receiver, wherein the RF transmitter is controlled in a reception interval for generating the field having a field strength of greater than 7.5 A/m, so that an RF signal which is sent by the RFID document is superimposed on the field.

5. The RFID reader according to claim 4, wherein the field strength is between 10 A/m and 20 A/m maximum.

6. The RFID reader according to claim 1, wherein the first distance is between 5 and 25 mm.

7. The RFID reader according to claim 1, wherein the support surface is delimited by at least one raised guide edge, and wherein an antenna coil of an RFID document placed on the surface and in contact with the at least one raised guide edge is supported in alignment with the transmitting and receiving antenna coils of the RFID reader.

8. The RFID reader according to claim 4, wherein the RF transmitter is designed for transmitting at a carrier frequency of 13.56 MHz.

9. The RFID reader according to claim 1, wherein the RFID reader is designed to communicate with the RFID document according to a Near Field Communication (NFC) standard.

10. An RFID system having an RFID reader according to claim 1 and an RFID document, wherein the RFID document has a document antenna having at least one document antenna coil, wherein the at least one document antenna coil lies in a third plane.

11. The RFID system according to claim 10, wherein the at least one document antenna coil is concentric with the transmitting antenna coil and/or the receiving antenna coil when the RFID document is in the position.

12. The RFID system according to claim 10, wherein the first plane and/or the second plane and/or the third plane are parallel to one another when the RFID document is in the position.

13. The RFID system according to claim 10, wherein the document antenna is designed for supplying power to an RFID circuit of the document.

14. The RFID system according to claim 10, wherein the RFID document has an emissive display device, and wherein the document antenna is designed for supplying power to the display device.

15. The RFID system according to claim 10, wherein the transmitting antenna, the receiving antenna, and/or the document antenna have the same diameter.

* * * * *

UNITED STATES PATENT AND TRADEMARK OFFICE
CERTIFICATE OF CORRECTION

PATENT NO. : 8,872,721 B2
APPLICATION NO. : 13/319360
DATED : October 28, 2014
INVENTOR(S) : Markus Tietke et al.

Page 1 of 1

It is certified that error appears in the above-identified patent and that said Letters Patent is hereby corrected as shown below:

In the Claims

Column 6, Line 41 should read as follows:
field having a field strength of greater than 7.5 A/m at the Signed and Sealed this
Fourteenth Day of April, 2015

Michelle K. Lee
*Director of the United States Patent and Trademark Office*